(12) United States Patent
Minard et al.

(10) Patent No.: US 6,733,771 B1
(45) Date of Patent: May 11, 2004

(54) SYSTEMS AND METHODS FOR FACILITATED FEED SUPPLEMENTATION

(75) Inventors: Rebecca M. Minard, Sherborn, MA (US); Paal C. Gisholt, Sherborn, MA (US)

(73) Assignee: SmartPak Equine, L.L.C., Pembroke, MA (US)

( * ) Notice: Subject to any disclaimer, the term of this patent is extended or adjusted under 35 U.S.C. 154(b) by 0 days.

(21) Appl. No.: 09/679,752

(22) Filed: Oct. 5, 2000

Related U.S. Application Data (60) Provisional application No. 60/158,207, filed on Oct. 7, 1999.

(51) Int. Cl.[7] .................................................. A23K 1/18
(52) U.S. Cl. ........................ 424/442; 424/400; 424/438; 426/108; 426/122
(58) Field of Search ................................ 424/438, 442, 424/400; 426/106, 108, 122, 124, 805, 807; 206/535, 539, 828; 119/57.03, 58, 61–69; 220/500, 503, 506–508, 524

(56) References Cited

U.S. PATENT DOCUMENTS

| | | | | |
|---|---|---|---|---|
| 59,255 A | * | 10/1866 | Otis | |
| 395,243 A | * | 12/1888 | Maggi | 119/61 |
| 516,249 A | * | 9/1894 | Meeker | 119/61 |
| 3,924,573 A | * | 12/1975 | Thomas et al. | 119/61 |
| 5,377,620 A | | 1/1995 | Phillippi | 119/51.12 |
| 5,787,839 A | * | 8/1998 | Magnant et al. | 119/51.5 |
| RE36,867 E | * | 9/2000 | Rozzano | 426/87 |
| 6,261,609 B1 | * | 7/2001 | Cates, II | 426/73 |

FOREIGN PATENT DOCUMENTS

| | | |
|---|---|---|
| CH | 535 006 A | 3/1973 |
| DE | 297 11 410 | 9/1997 |
| GB | 680 817 A | 10/1952 |
| GB | 1 474 931 A | 5/1977 |
| JP | 10014501 | * 1/1998 |

OTHER PUBLICATIONS

Ensminger—The Stockman's Handbook pp. 409, 413–415, 419, 422, 423, 432, 1978.*

Smart Pak.*

Patent Abstracts of Japan, vol. 1998, No. 05, Apr. 30, 1998 & JP 10 014501A (Nisshin Flour Milling Co. Ltd.), Jan. 20, 1998.

* cited by examiner

*Primary Examiner*—Neil S. Levy
(74) *Attorney, Agent, or Firm*—Peter F. Coreless; Edwards & Angell, LLP

(57) ABSTRACT

The present invention provides a multi-compartment package, a machine for the automated or semi-automated packaging of a diverse array of animal supplements into such packaging, and a process allowing efficient procurement and fulfillment of custom supplement orders.

32 Claims, 11 Drawing Sheets

| Supplement | Week 1 | Week 2 | Week 3 | Week 4 |
|---|---|---|---|---|
| " A | 1 [A/V]—72 | [A/V] | [A/V] | [A/V] |
| " B | 71—2 [A/V] | — — — — — — —etc. | | |
| " C | 1 | | | |
| " D | 1 | | | |
| " E | 1 | | | |
| etc. | | | | |

FIG. 23

SYSTEMS AND METHODS FOR FACILITATED FEED SUPPLEMENTATION

The present application claims the benefit of U.S. provisional application No. 60/158,207, filed Oct. 7, 1999, incorporated herein by reference in its entirety.

BACKGROUND OF THE INVENTION

1. Field of the Invention

The present invention relates to a system for administration of equine and other animal supplements and feed additives comprising a unique package, an apparatus for packaging supplements into such a package, and a process to transact shipments of these supplements.

2. Background

Given the opportunity to graze in a diversified meadow, horses and other livestock will seek out a balanced diet by eating the plants they require. When removed from free range grazing, horses require a combination of cultivated hay and commercial horse feed to maintain adequate caloric intake. Horses also require adequate micro and macronutrients (such as vitamins and minerals). Generally, manufacturers of commercial horse feed add vitamins and minerals to processed grain. The amounts of nutritional additives are targeted toward the average horse. Many horse owners, trainers and veterinarians believe that further nutritional supplementation is beneficial for horses in active training, competition, those with health problems, or those who fall in some general demographic groups (older, pregnant, etc.).

Nutritional supplements can consist of vitamins, minerals, amino acids, proteins, herbs, oils, etc., and are intended to provide additional nutritive support for the horse. Specific supplements routinely added to the horse's diet include, but are not limited to: Vitamins A, the B-complexes, C, D, E, H, K; chemical entities such as MSM, DMG, DMSO, etc.; minerals including copper, manganese, selenium, cobalt, iron, phosphates, zinc, sulfur, etc.; proteins such as Glucosamine HCl, Glucosamine Sulfate, Chondroitin Sulfate, Perna Mussel; Electrolytes such as sodium, potassium, chloride, magnesium, etc.; naturally derived substances, such as Brewer's Yeast, Bee Pollen, and Yucca; and herbs including Devil's claw, echinacea, mint, St. John's wort, etc.

In addition to nutritional supplements, there are other additives that may be routinely added to a horse's feed. These include, but are not limited to: 1) daily dewormer, used to control intestinal parasites, 2) feed through insecticide, to prevent flies from using horse manure as a breeding ground, and 3) garlic, which is believed to repel flies. For purposes of this disclosure, the term supplements will be used to describe all additives that are customarily added to feed prior to consumption.

Presently, most supplements are marketed in bulk containers with airtight seals to maintain freshness and potency. Most of these containers have a plastic bag lining the inside that further protects the product, usually sealed by a wire twist closure. In most cases, the horse owner is responsible for maintaining their own personal supply of supplements.

The present system of administering supplements to horses gives rise to a number of specific problems. First, administration of the supplement is time consuming and labor intensive. For each solid supplement, the person feeding the horse must 1) open the airtight tub, 2) open the twist closure on the internal bag, 3) fish out the scoop, 4) precisely measure out the appropriate amount of supplement for that particular horse on that particular day, 5) replace the scoop, 6) re-close the internal bag, and 7) reseal the tub. This process is repeated for each additional supplement received by that particular horse. With some horses receiving as many as a half a dozen supplements or more, this can be time consuming and offers the opportunity for potential errors of omission or measuring. The person feeding the horse must then repeat this process for every horse to be fed in the facility.

Second, the present approach can result in over or under dosing the horse, either through an error in measuring, or because the horses' intended daily dose is not properly communicated to the person feeding. For a single horse, the dosage can vary by day based upon a number of factors, including length of time on the supplement, time of year, and intensity of work/competitions. Horse owners complain of a given container of supplement lasting either far longer or shorter than would be expected if the horse received the appropriate dosage each day.

Third, some horse feeders simplify the feeding process by feeding a group of horses receiving a similar supplement out of a single horse's supplement bucket. This involuntary "sharing" causes angst among some horse owners, who want the costly supplements that they have purchased to go exclusively to their own horse. It also creates uncertainty as to whether their horse is receiving his supplement on a regular basis, or whether the horse is receiving another supplement that may not be desirable or could have contraindicated ingredients.

Fourth, because supplement inventory is generally managed by the owner, and supplements are often consumed at an erratic rate, owners frequently receive little notice that they are "about to run out" of a given supplement. For many supplements, continuity of treatment is desirable. An impending shortage can result in an urgent need to replenish and may cause logistical challenges for the owner.

Horse facilities have attempted to cope with the complexity of supplement feeding in a variety of ways. Some horse facilities have taken to limiting outright the number of supplements they are willing to feed and/or assessing a surcharge for horses receiving supplements. Some barns simplify supplement feeding by giving all horses on the same supplement the same dosage. This approach can result in over or under dosing (for example, a 800 pound pony receives the same amount as an 1,500 pound horse). Some barns leave the supplement containers uncapped, making access easier, but causing oxidation and a loss of potency, particularly when large tub sizes are used that are consumed over an extended time.

Some horse owners prepare their own mixtures of supplements for their horse(s) in advance. It is possible that pre-mixing multiple supplements could result in an unintended chemical reaction either compromising the quality of the supplements through a cross reaction (e.g. acid base or metallic reduction reactions) and/or losing potency. Also, depending upon how many days in advance these mixtures are prepared, the supplement may be subject to oxidation, risking a further loss of potency.

There has been relatively little activity to solve the logistical problems posed by supplements by their manufacturers. Two companies—Select the Best and Vitaflex—each offer one of its products in single dose packaging. While this facilitates administration of this particular supplement by eliminating the measuring element, their single standard-sized package limits the flexibility of the amount of supplement administered. Further, this system does not reduce the complexity of administering multiple supplements. See also U.S. Pat. No. 3,845,744 and 5,555,482.

It thus would be desirable to have improved methods for providing supplements to horses and other animals.

SUMMARY OF THE INVENTION

The present invention is a system designed to solve the above problems comprising a multi-compartment, easy to open package, a machine for the automated or semi-automated packaging of a diverse array of equine supplements into such packaging, and a process allowing efficient procurement and fulfillment of custom supplement orders.

More particularly, in a first aspect, packaging is provided which is easy to handle as a single unified whole, and that comprises multiple sub-containers or sub-compartments capable of maintaining separation between a plurality of solid and/or liquid animal supplements or feed materials. Suitably, distinct animal feed materials will be placed in distinct, separated compartments of the packaging. Specified amount of the feed materials also can be placed in each compartment to provide a customized feed or dosage amount for a given animal.

The packaging of the invention is particularly useful for administration of feed supplements to horses. Accordingly, the packaging of the invention will be especially useful in horse stables, i.e. buildings that house one or more horses. The packaging of the invention also is useful for administration to a variety of other animals, including dogs and camels.

The invention also includes methods for administering supplement feed materials to an animal such as a horse or pet, which include administering to the animal multiple, distinct supplement feed materials without use of an administration tool (e.g. without the use of a scoop). The administered feed materials are suitably contained in a multiple-sectioned unitary package as disclosed herein prior to administration to the animal. As referred to herein with respect to such methods, an administration tool is a scoop, scoop-type device or other manual or mechanical feed delivery device as has been used previously.

In another aspect, the invention provides apparatus useful to package equine or other animal supplements into the packaging described above. Preferably, the apparatus can draw from a plurality of potential supplements and dispense a desired amount of each of the selected supplements into separate sub-compartment within each container.

As discussed above, in a yet further aspect, processes are provided by which orders are received, fulfilled, and shipped. Customers (most likely the horse owner, owner's agent, veterinarian, or trainer) will be able to order the supplement utilizing a web site that will provide the following functionality: 1) Ability to customize the supplement dosing regimen, 2) user friendly access to academic and lay information about each supplement, 3) promotions offered by manufacturers, 4) a summary of totals of various ingredients administered, and 5) ability to sign up for automatic fulfillment, delivered to either home or stable.

The packaging, apparatus and processes of the invention will be useful with a wide variety of animals, including livestock such as camels, cattle, sheep, and the like, as well as pets such as dogs and cats. However, as mentioned above, the invention is particularly useful for providing supplements to horses. Accordingly, the present description of the invention is generally directed to use of the invention with horses, although it will be understood that the invention can be used in the same manner with other animals, including pets and livestock.

Other aspects of the invention are discussed infra.

DETAILED DESCRIPTION OF THE INVENTION

As stated above, in a first aspect, the invention provides packaging which is handled easily as a single unified whole, and that comprises multiple sub-containers or sub-compartments capable of maintaining separation between a plurality of solid and/or liquid equine supplements. For the sake of illustration, the Figures depicting the packaging will contain 6 compartments, although the number of compartments can range from 1 to 20 or more. Preferred packaging may contain 2, 3, 4, 5, 6, 7, 8, 9, or 10 or more compartments.

Figure 1:
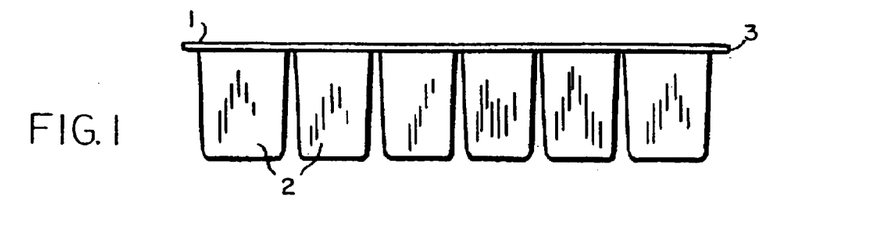
FIGS. 1–12 show various preferred packaging and related apparatus of the invention.
Figure 2:
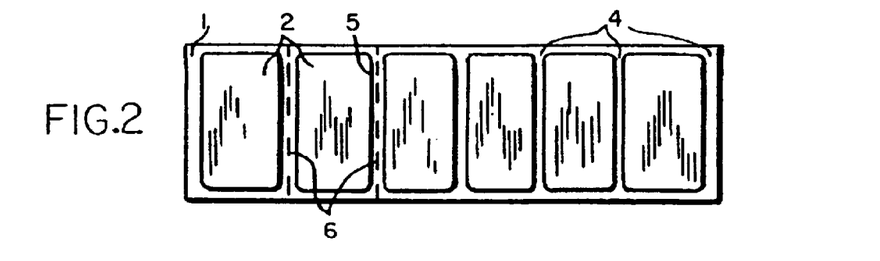

In a preferred embodiment as generally depicted in FIGS. 1 and 2, the container is a rigid or flexible thermoplastic tub (1) with individual compartments (2) that, when placed in contact with a closure (3), forms a seal (4) preventing communication of materials between the chambers. In the preferred embodiment, the tub is made up of a plurality of sub-compartments, arranged in a linear fashion. In a further embodiment, the union between the subcompartments of the tub (5) are perforated or scored (6) to enable individual sub compartments to be snapped apart, thereby allowing the customer to separate a group of supplements to be administered in the am feeding from subcompartments holding a group of supplements to be administered in the pm. Alternatively (FIG. 3), the sub-compartments may be arranged radially, in pie shaped wedges (7). Alternatively (FIG. 4), the sub-compartments may be arranged in a two dimensional array (8). The tub will be formed in such a manner as to allow stacking, so as to facilitate cost-effective shipping and storage.

The tub suitably may be made of essentially any thermoplastic and preferably to be non-brittle at temperatures down to about 0° Fahrenheit. The preferred material is PET, which is easily molded, relatively cost effective, non-brittle at low temperatures, a good vapor (moisture) and oxygen barrier, and recyclable. Other materials that may be used include a high impact polystyrene, high density polyethylene, polypropylene, polyester, or copolymers of one or more of these resins. A vapor impermeable coating (e.g. Saran) may be added to impart further barrier properties. Plasticizers may be added to reduce brittleness at low temperatures. The closure can be made of a variety of materials, the most preferred being a flexible polymeric film laminated to foil. Other potential materials for the closure include foil alone, paper/foil, polymer combinations, or rigid plastic. Both the closure and the tub may be printed.

The preferred method for closing the lid and achieving the seal between the compartments is heat sealing, e.g. with a blister sealing machine made by Alloyd, among others. The preferred method for achieving a "peelable" seal utilizes a layer of Polyethylene layer in contact with the tub, though pressure sensitive adhesives, traditional adhesives, and clips also may be used. The package may be opened (FIG. 5) with a single pull of the lid closure by use of an overlap of excess material (9) at the end of the package (10) or the un-adhered corner of the lid (11).

In another embodiment (FIGS. 6 and 7), the packaging material is a flexible polymeric film that is "converted," creating attachment lines (12), forming a plurality of individual sleeves (13) that keep the supplements separated from one another. This material will be stored in roll form, the orientation of which may run either parallel with or perpendicular to the attachment lines. The materials used for the package can consist of, but are not limited to, polyethylene, polypropylene, polystyrene, polyester, or any copolymers thereof. A notch will be cut into the top band of the package (14) to permit tearing open of the package without use of tools. Alternatively, a tear cord will be incorporated into the top of the package. Alternatively, scissors may be used to open the package. The package and all of the chambers should be able to be opened using the notch or with a cut of the scissors or similar cutting blade.

Figure 8:
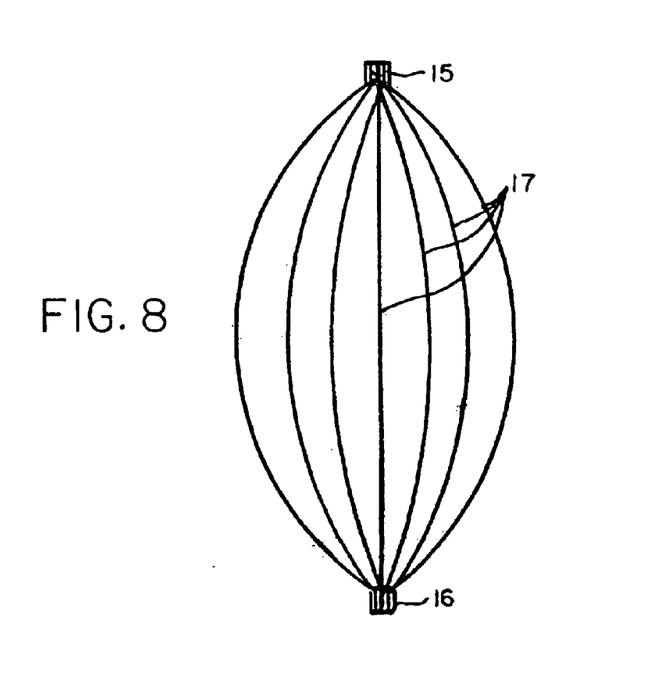

In another embodiment, individual flexible polymeric packages are first filled with supplement and then bonded together in a secondary process to form a single unit (FIG. 8). The materials for this embodiment may include e.g. polyethylene, polypropylene, polystyrene, polyester, etc. or any copolymers thereof The bonding can be accomplished by, but is not limited to, heat sealing, sonic or ultrasonic welding, metallic clips, folding of the materials, or adhesives. These individual packages may be connected at the top (15), bottom (16) or middle (17) only, the top and bottom, or along the entire length of the packages. The package and all of the chambers should be able to be opened with a cut of the scissors or similar cutting blade.

Figure 9:
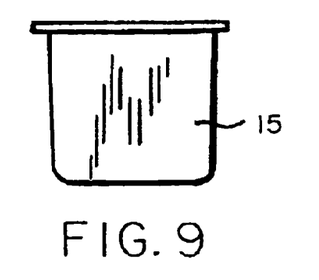
Figure 10:
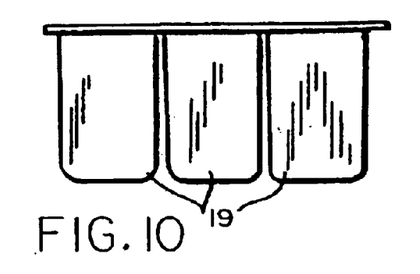

In another embodiment (FIG. 9), the supplements are combined into a single package (18), with no separation maintained between the supplements, so long as the combined supplements retain their potency. Preferably, the package will be sealed to prevent the contents having any type of substantial exposure to external atmosphere or moisture. Heat sealing will provide such a substantial exclusion of external atmosphere or moisture. In yet another embodiment (FIG. 10), a plurality of chambers is used wherein supplements are grouped into sub-compartments (19) based upon their chemical compatibility/lack of cross-reactions.

Figure 11:
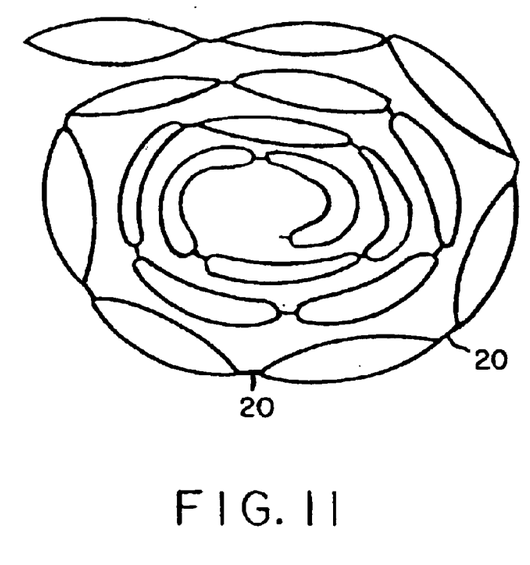

In all embodiments utilizing flexible packaging, the preferred embodiment suitably will include linking the packages in chronological order (FIG. 11), such that each of the packages may be tom off sequentially along a perforation (20), prior to administration of the supplement. Alternatively, the packages may be packaged in a dispenser such that chronological order is achieved.

Figure 12:
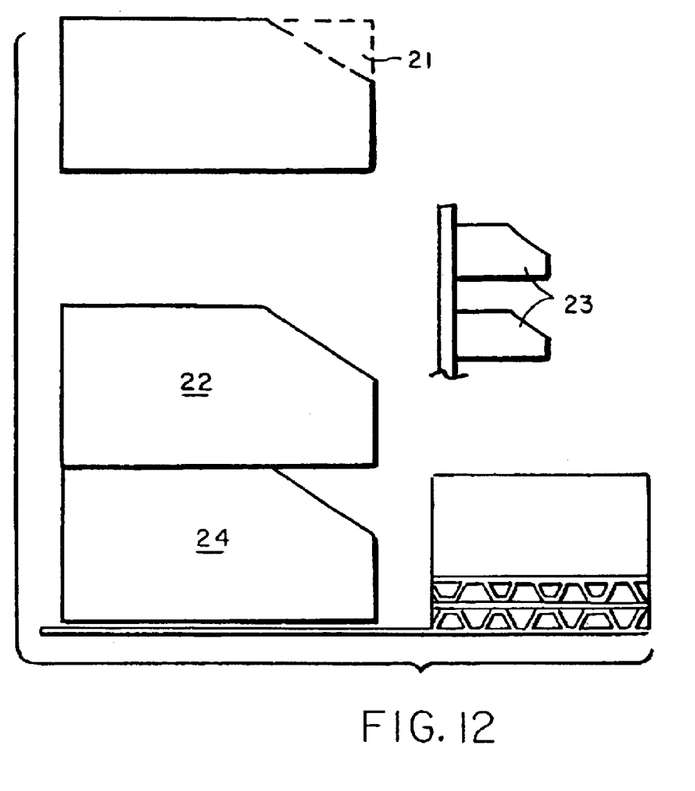

Preferably for all embodiments (FIG. 12), the shipping container will contain a perforated corner (21), permitting the corner to be removed, allowing the shipping container to be utilized as a functional dispenser of multicompartment tubs. Functionality as a dispenser will be enhanced by the shipping container's ability to be stacked one on top of the other (22), hung from a wall (23), or placed on a flat surface (24). The size of the shipping container may be minimized by alternating the orientation of each package in a right-side-up, upside-down fashion (24a).

The packages of the invention and sections thereof can be a wide variety of sizes. Preferably, a single package will be easy to carry and manipulate by a single person. For example, the total filled package will typically be about 2, 3 or 4 pounds or less, and each section may contain less about 1 pound of feed materials, more typically about 1, 2, 3, 4, 5, 6, 7 or 8 ounces of material.

Multiple packages (suitably each with multiple sections) also may be employed for use with a horse or other animal.

In manufacture and shipping, multiple packages also may be removably affixed to each other, e.g. in a snap-apart relationship, and each individual package separated at time of use. Alternatively, packages may be affixed with an adhesive label.

As discussed above, the invention further provides apparatus useful to package equine or other animal supplements into the described multiple compartment packaging. The apparatus preferably can draw from a plurality of potential supplements and dispense a precise amount of each of the selected supplements into separate sub-compartment within each container.

Figure 13:
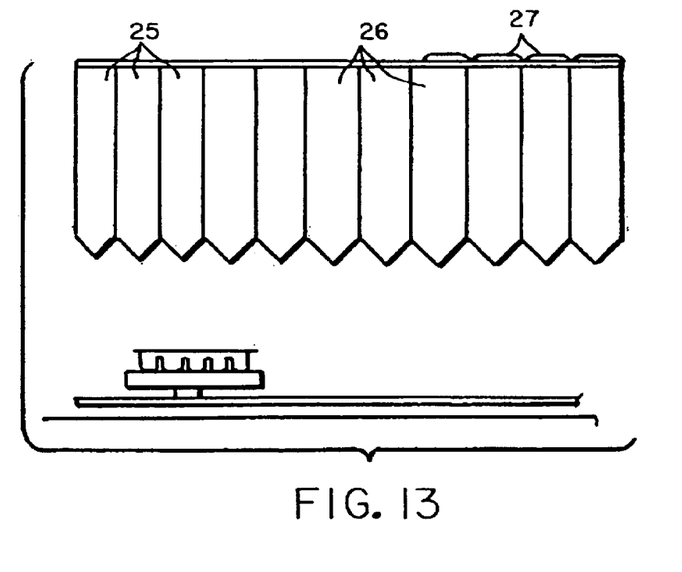
FIGS. 13–22 depict preferred dispensing and packaging apparatus of the invention.

More specifically, with reference to the preferred exemplary system depicted in FIG. 13, supplements (25) will be stored in individual bulk hoppers (26) prior to dispensing. In the preferred embodiment, up to 100 supplements will be available for dispensing. The supplements suitably may comprise of one or more of several classes of materials, including non-bridging/"free flow" powders, bridging/"non-free flow" powders, granules, pellets, crumble (a heterogeneous mixture, generally incorporating whole grains) and liquids of varying viscosity. As some supplements are hydrophilic, the hoppers contain an airtight lid (27), and may include a system to replace atmospheric oxygen with gaseous nitrogen. For the same reason, the apparatus is kept and used in environmentally controlled conditions.

Figure 14:
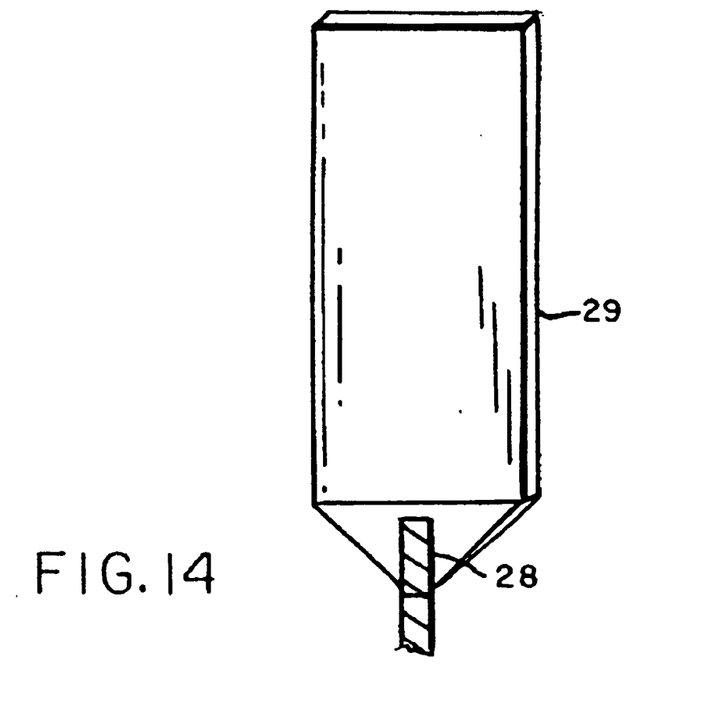
Figure 15:
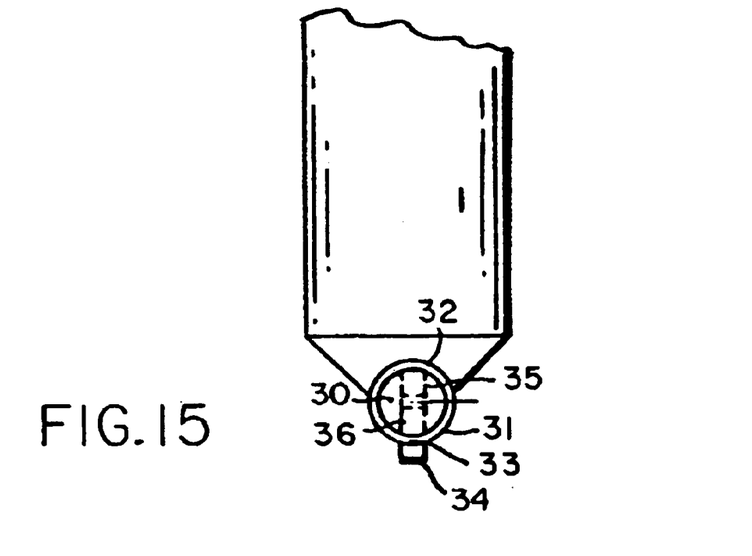
Figure 16:
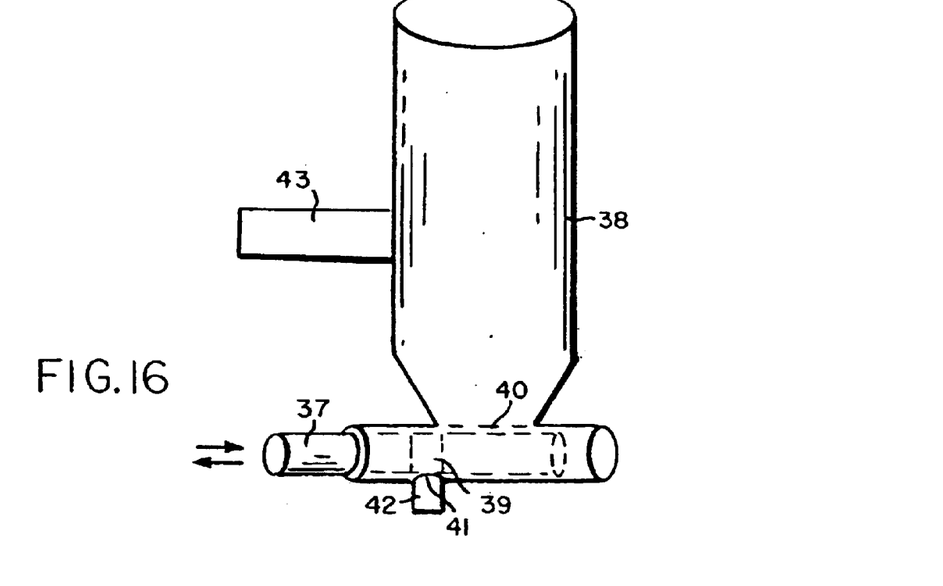

Metering of a precise amount of supplement may be accomplished in a number of ways, with the most preferred being an auger system (FIG. 14), capable of dispensing a precise amount of material. An individual auger (28) is dedicated to each specific supplement hopper (29). Alternate dispensing techniques include a rotational metering device (FIG. 15) that comprises a solid cylinder (30) with a certain outer diameter that may be rotated within a hollow cylinder (31) of approximately the same inner diameter. This rotating device communicates through a passage (32) to the hopper above it and through a similar passage (33) to a dispensing tube (34) beneath it. The solid cylinder has a cavity (35) that can be alternately exposed to the gravity fed hopper when facing upward (the filling phase) and the dispensing tube when facing down (the discharge phase). By rotating this device, the cavity is repeatedly filled and emptied. Filling may be accomplished with fewer rotations by forming a plurality of cavities in the solid cylinder (36). Alternatively, a piston type dispensing head (FIG. 16) may be employed wherein a dispensing head (37) that is exposed to the contents of the hopper above it (38) shuttles head back and forth, allowing a cavity that transcends the shuttle head vertically (39) to be repeatedly filled from the orifice facing the hopper (40) and emptied through an offset orifice (41) into the dispensing tube (42). The use of a vibrator (43) facilitates the accurate dispensing process, particularly for non-free flow materials, for all of these methods.

Preferably, the apparatus and related methods of the invention will dispense feed materials in an amount of within about 15 or 10 weight percent or less of a targeted amount, more preferably within about 8 or 5 weight percent or less of a targeted amount, still more preferably within about 4, 3, 2, or 1 weight percent or less of a targeted amount.

Through such methods, feed supplements can be administered to a horse or other animal without use of a hand scoop or other such article as now employed.

The size of the cavity for each of these metering methods will depend upon the recommended dosage of the particular supplement to be administered. Supplements usually come with a measuring scoop specific to that particular supplement (e.g. 11 cc for supplement X, and 24 cc for supplement Y). The most typical dose would be one "scoop," allowing dosing in scoop increments depending upon the number of times the dispensing head is actuated. Alternatively, the cavity size suitably may be a half scoop, to allow more fine tuning of the dosage. The cavity size may be reduced to as small as one tenth of a scoop to provide optimal dosing. A scoop suitably can range in size from approximately one tenth or one half ounce to approximately four ounces or more. Actuation of dispensing heads may be achieved either manually, with a crank or with a series of electric motors. It should be noted that under the fully automated approach, the manufacturing system provides instructions to the dispensing head, which may involve administering differing amounts of each supplement into each tub. This allows for the dosage of any supplement to be increased or decreased for each tub on a customized basis, corresponding to customer order.

Communication of the powder from the dispensing head into the container may be achieved in a number of ways. A preferred embodiment involves arranging the linearly arranged containers end to end and passing them under the dispensers on a conveyor system. A controller tracks the position of each of the tubs' sub-compartments, and actuates the appropriate dispenser. Thus, tubs may be filled, sealed, and labeled in a continuous process. This method also may be utilized in filling the converted multiunit flexible packaging (FIGS. 6 and 7), with the length of the roll running perpendicular to the attachment lines. The roll is fed under the series dispensers, with the end facing up, such that materials may be suitably dispensed into the appropriate sub-compartment of each container. This would result in a long, continuous strip of filled containers. Each container is then suitably sealed at the top, suitably printed with information specific to that order as well as the contents of each sub-compartment. Each container then may be cleaved from the strip, or a perforation may be made between each container in the strip to allow for subsequent detachment.

Another method (FIG. 17) involves placing a linearly arranged, compartmentalized container (44) on a material handling system (45) under the dispensing tube (46) of the first supplement to be filled. Alongside of this container would be placed a plurality of such containers (47), with a total of 28 being the preferred number, but which number could be between e.g. one and 250 or more. The material handling system is capable of precisely positioning any subcompartment in the entire array of multi-compartment containers under the feed heads using an X and Y table system. The X and Y table system is designed as follows: the X table (48) rests on sliders (49) attached to a Y table (50), which rests on sliders (51) running perpendicular to the first set of sliders, attached to a large fixed bench (52). In the preferred embodiment of the system, the movement of the X-Y table is controlled by motors turning a worm gear, or conveyor belt, chain and sprocket, ball screw, or other linear transport system.

Figure 17:
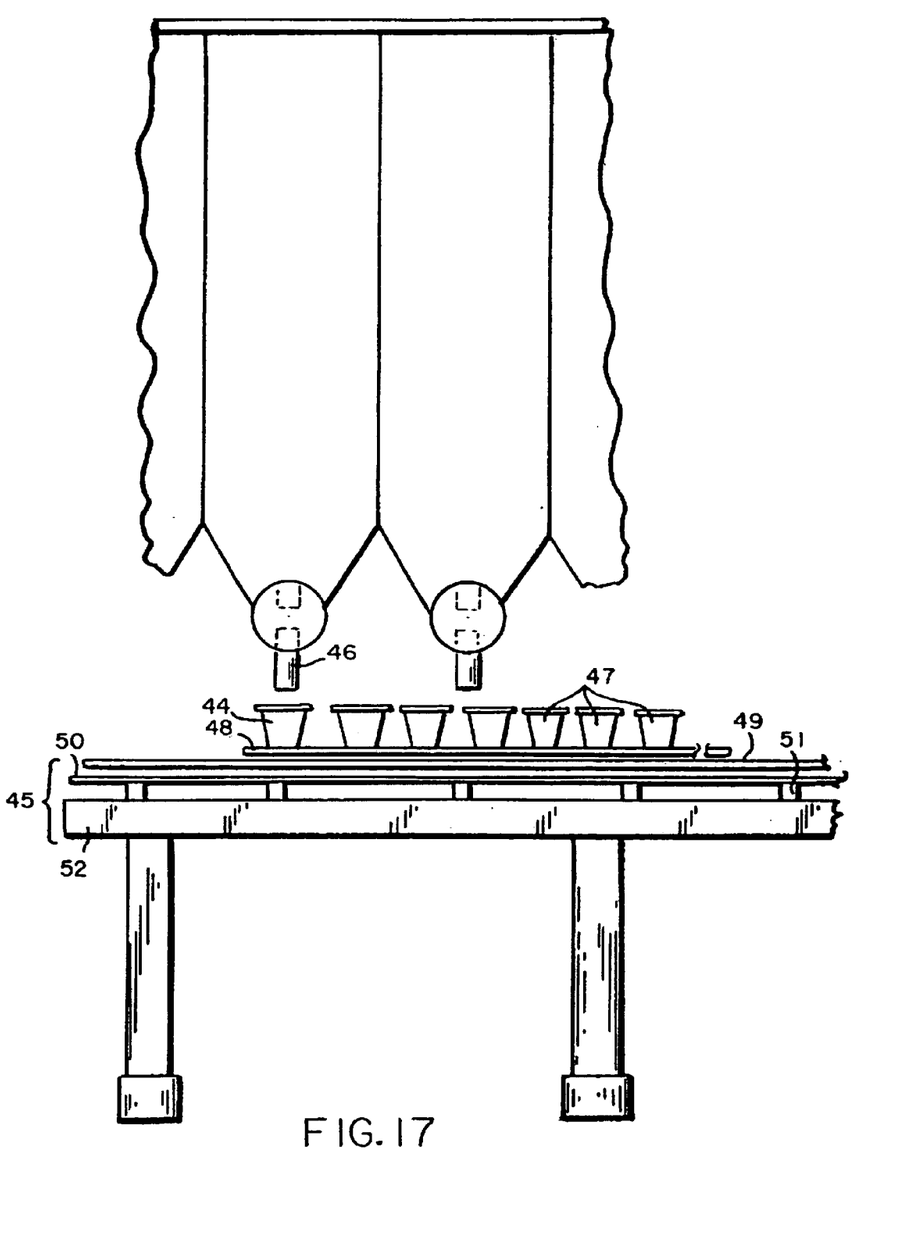

The filling begins with the first container's proximal sub-compartment being filled by actuating the dispensing head. In the preferred embodiment of this invention, the dispensing head is actuated by a motor. Upon completion of filling the proximal sub-compartment of the first container, the material handling system will advance the X table direction by the exact width of the container, such that the same dispensing tube is now above the first subcompartment in the container immediately adjacent to the one just filled. This process of alternating filling and advancing of the array of containers occurs until all containers have had their first sub-compartment filled. Next, the material handling system advances the entire array of tubs in the Y direction by exactly one tub width. The X table is then manipulated to position the left-most tub under the dispensing head of the next supplement to be filled. This process is repeated until the order is completed. Registration of the location of the X-Y position may be achieved by a radio triangulation system, encoder or contact switches.

In an alternative embodiment, the actuation of the dispensing heads and/or the placement of the containers is accomplished by a manual process.

Figure 3:
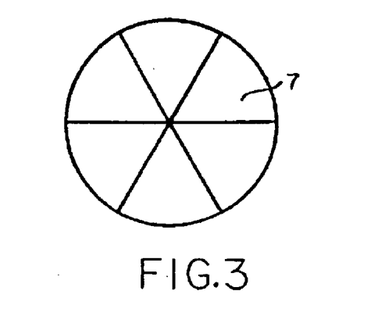
Figure 4:
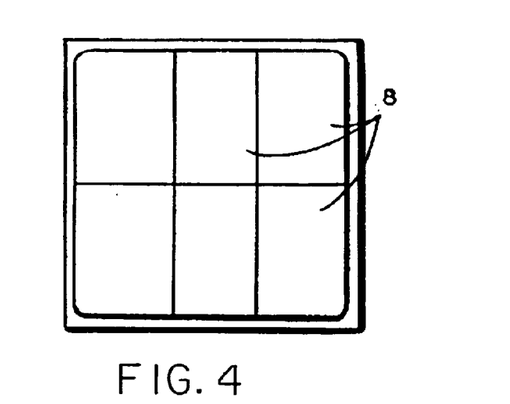
Figure 18:
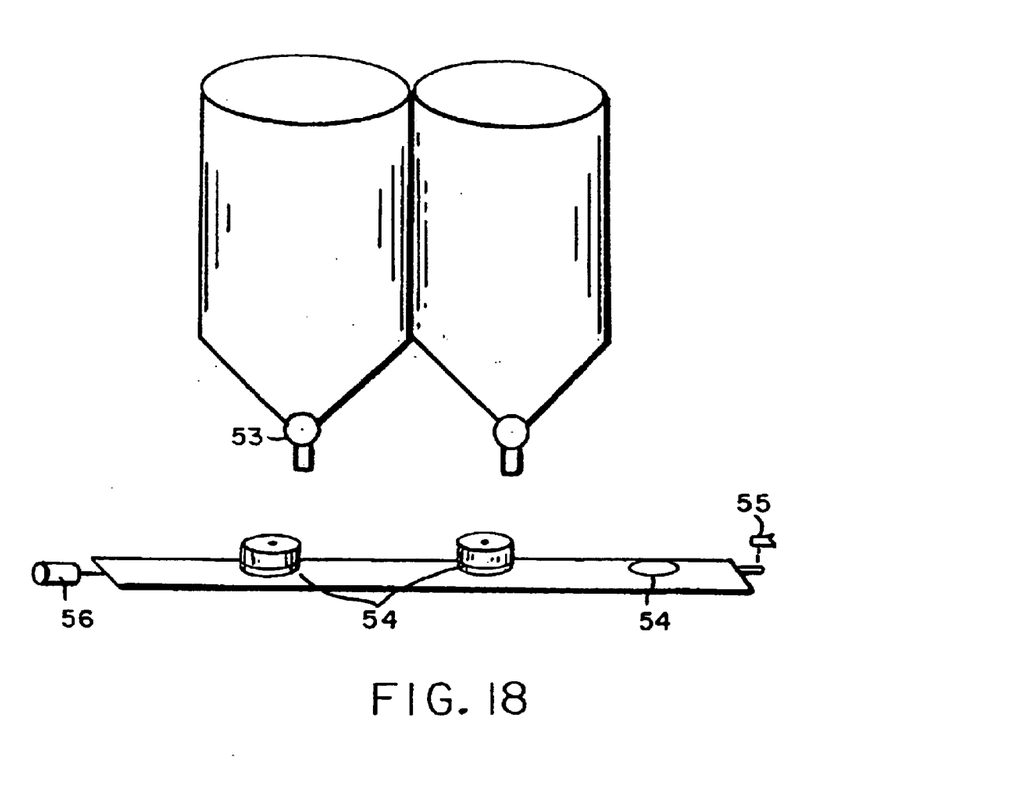

In an alternative embodiment (FIG. 18), a one dimensional array of circular tubs with pie shaped sub-compartments as described in FIG. 3 is placed upon a carriage that can be directed under the dispensing tubes (53) and which contains turntables (54) connected with gears or belts such that a group of pie shaped tubs resting upon the carriage may be rotated in unison. In this embodiment, the first tub is positioned under the fill head of the first supplement to be administered. It is then filled. The array of tubs is then advanced in a linear direction such that the next tub in the array is placed under the dispensing tube. This process is repeated for a specific number of repetitions (most preferably 28 tubs) until the entire array has been filled with the first supplement. The tubs are then rotated in unison such that an empty compartment is precisely positioned below the dispensing tube. The rotation of the turntables may be actuated either manually, with a crank (55) or with a motor (56).

Figure 5:
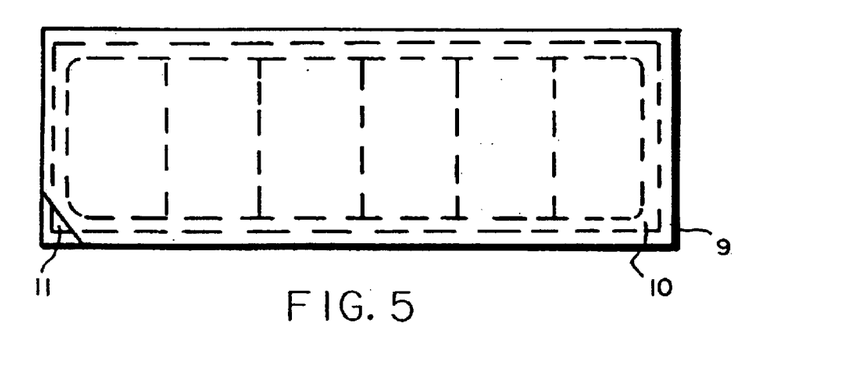
Figures 6, 7:
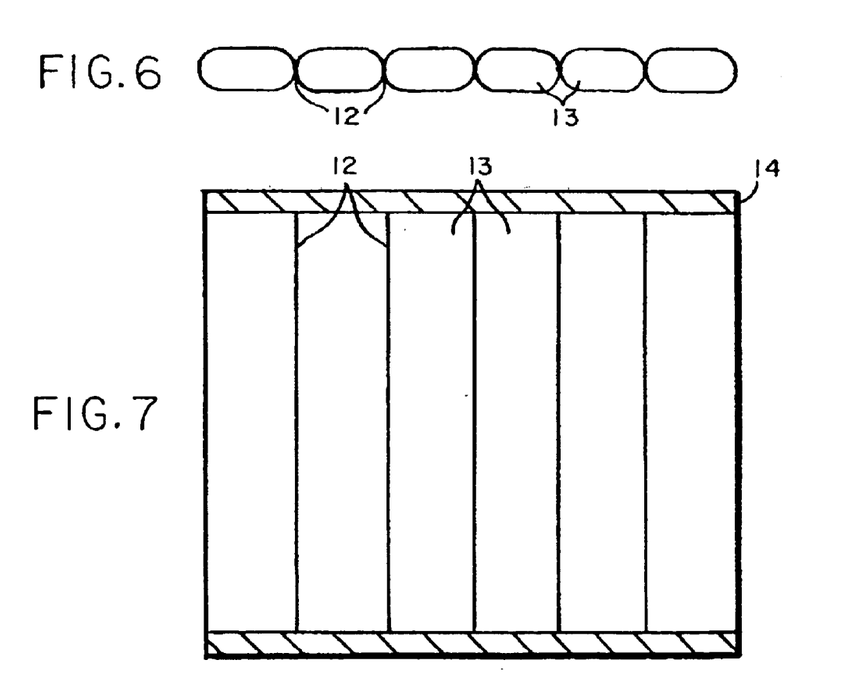
Figure 19:
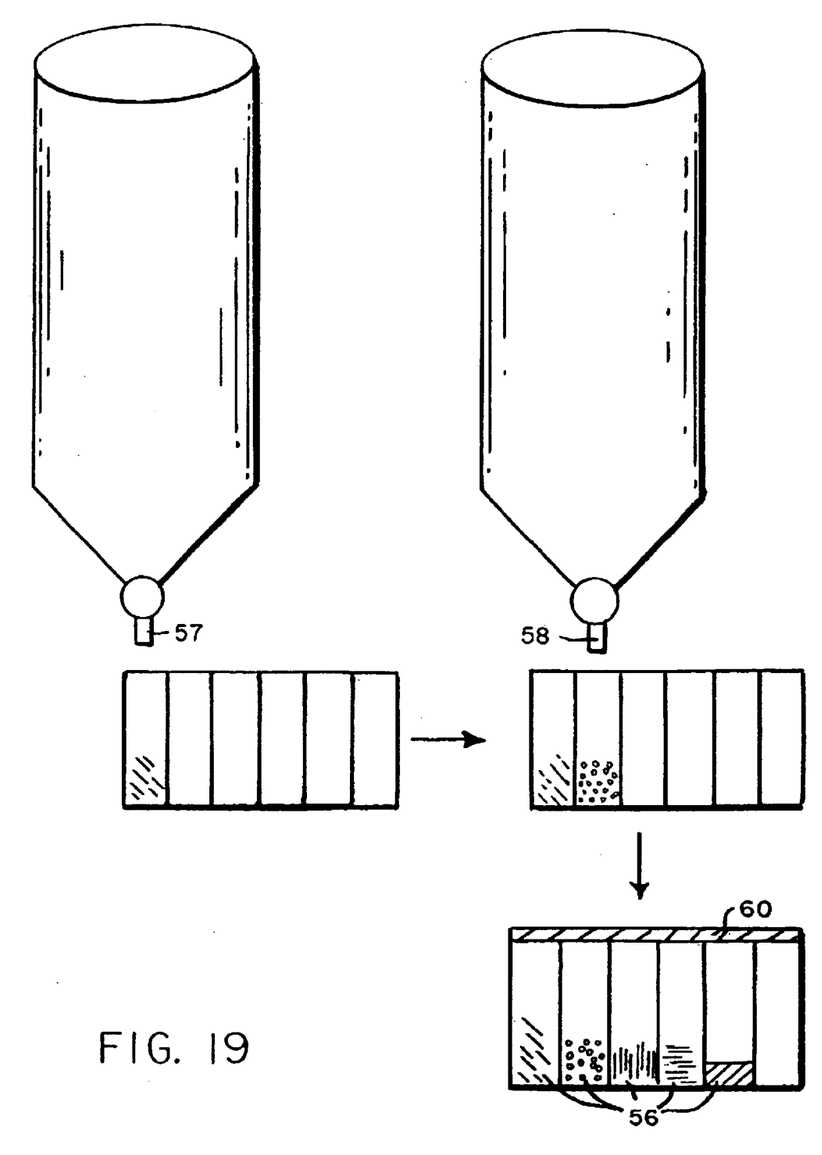

In another embodiment (FIG. 19), the multi-compartment flexible package described in FIG. 5 and 6 may be positioned under a dispensing tube (57), then moved and held under a second dispensing tube (58), and so on until a plurality of sub-compartments (59) are filled. The bag is then closed at the top (60), with the preferred method being heat sealing, although other approaches to closure such as sonic welding, or clipping may be employed.

Figure 20:
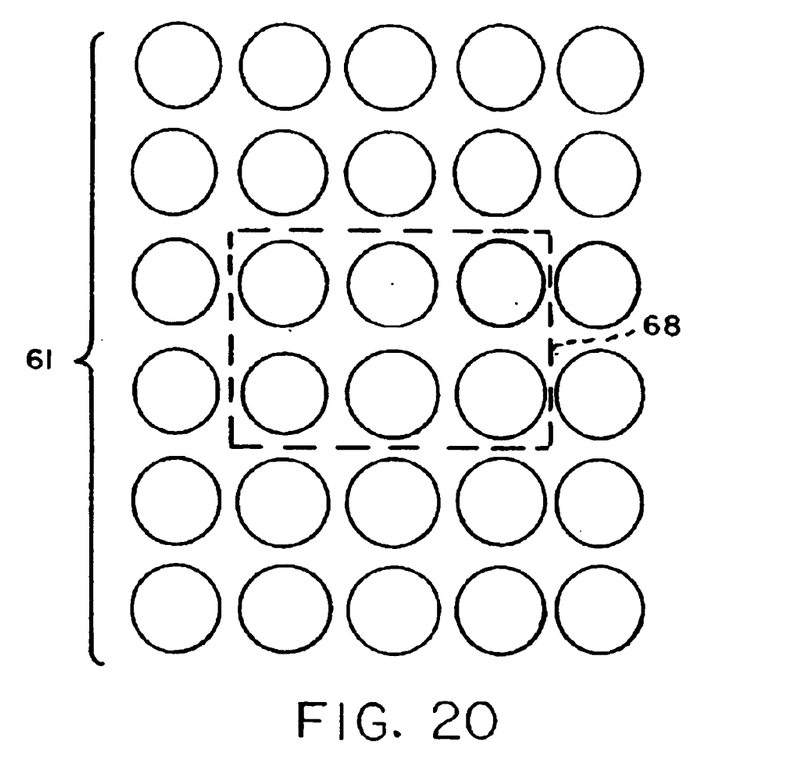
Figure 21:
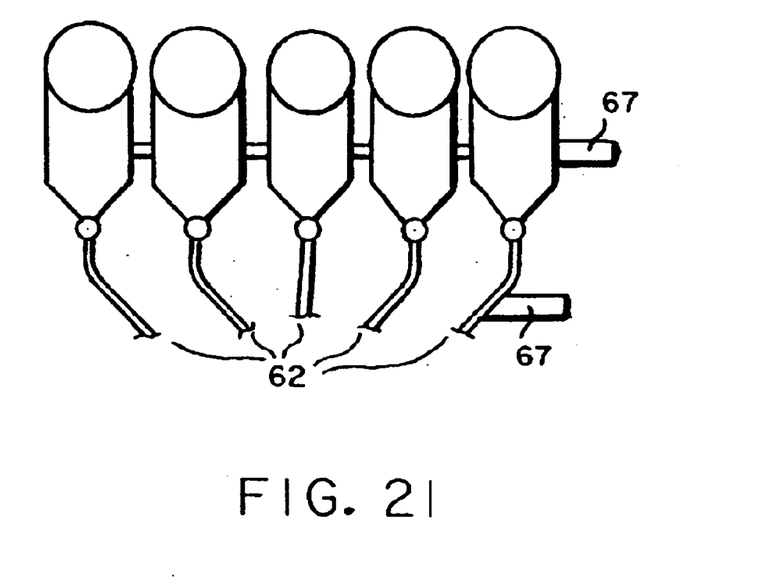
Figure 22:
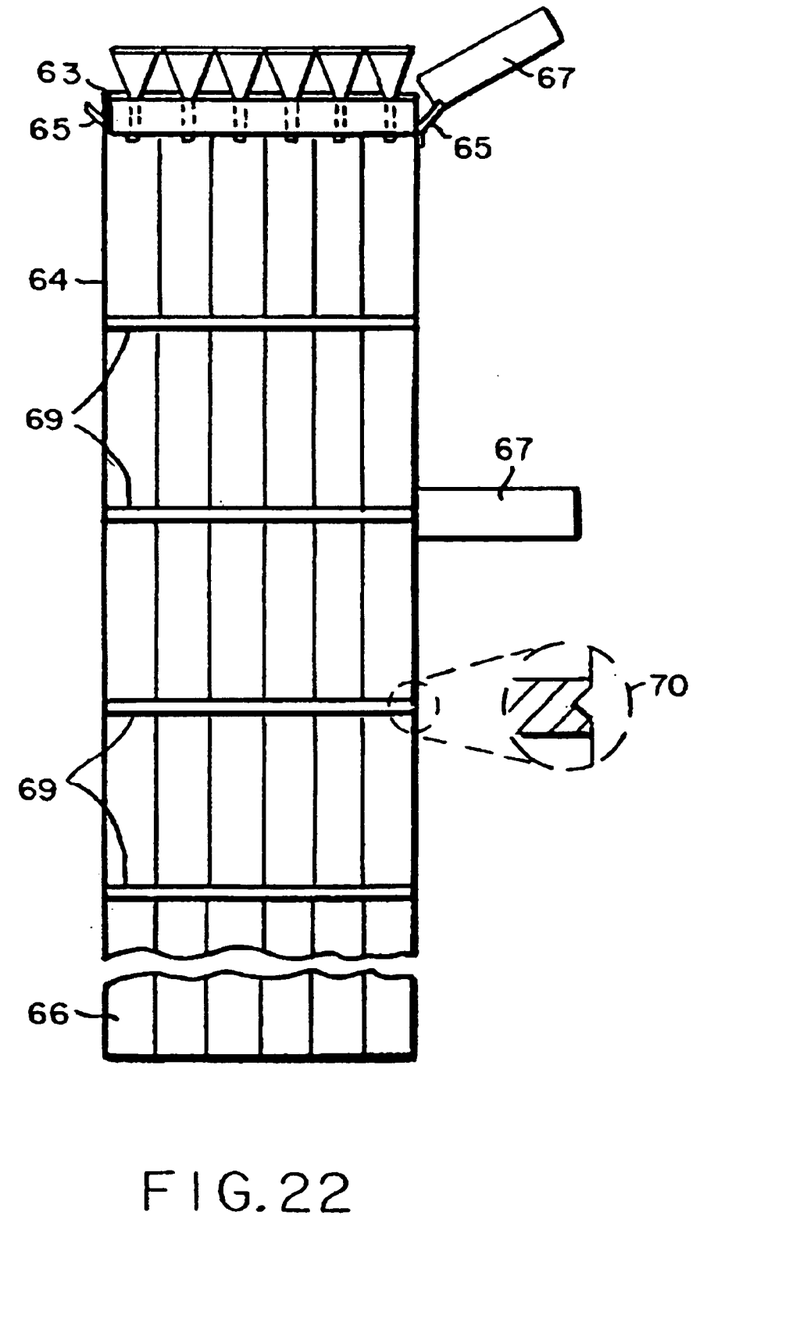

In another embodiment (FIG. 20 top view, FIG. 21 side view, FIG. 22, side view), the hoppers are arranged in an array, for example a 5×6 array of 30 hoppers (61). The dispensing tubes (62) are elongated and flexible such that they can be directed. Under the array of dispensing tubes is a rack (63) that holds open a multiple foot long, sock like bag (64) with approximately six compartments. The bag is held in place by a pair of hinged clips at each end of the rack (65). For each new supplement batch (i.e. going to one customer), there is a manual process by which the dispensing tubes are placed in the top of the sock-like bag, which hangs vertically. Then, supplements are dispensed out of each of the active dispensing heads more or less simultaneously, with the material dropping to the bottom of the bag (66). A vibrator (67) is applied to the hoppers, tubes, rack, and bag as needed (depending upon the supplement) to minimize sticking. Powder sticking in the dispenser tubes is also minimized by placing the non-free flowing powders at the center of the array (68), allowing those dispensing tubes to remain as close to vertical as possible. An operator then heat-seals an area above the contents of the package (69), forming the top of that individual package and the bottom of the next. This sealer incorporates a perforation tool, allowing each individual package to be part of a roll, easily separated from the roll, with a notch in the sealing band (70) to facilitate easy opening. Upon completion of the seal, the dispensing heads would again more or less simultaneously discharge the next amount of supplement, and the process would be repeated either seven, fourteen, or twenty eight repetitions.

In yet another embodiment, the joined individual bags described in FIG. 8 are created in a two step process. The first step involves filling individual bags and sealing the bags. This can be accomplished by using an auger to do the dispensing and sealing the bags by using either an autobagger or by hand using any number of heat sealers. In a secondary process, the baggies are joined together using the techniques described above. Alternatively, the supplements may be placed in the baggies using a form/fill/seal machine, in anticipation of the secondary processing.

Any of the wide variety of supplements or other feed materials that might be administered to horses and other animals can be administered with the packaging and apparatus of the invention, including e.g. vitamins such as Vitamins A, C, D, E, H, K and the B complexes; chemical entities such as MSM, DMG, DMS0, etc.; minerals including copper, manganese, selenium, cobalt, iron, phosphates, zinc, sulfur, etc.; proteins such as Glucosamine HCl, Glucosamine Sulfate, Chondroitin Sulfate, Perna Mussel; Electrolytes such as sodium, potassium, chloride, magnesium, etc.; naturally derived substances, such as Brewer's Yeast, Bee Pollen, and Yucca; herbs including Devil's claw, echinacea, mint, St. John's wort, etc.; and the like.

As discussed above, in a yet further aspect, processes are provided by which orders are received, fulfilled, and shipped. Customers (most likely the horse owner, owner's agent, veterinarian, or trainer) will be able to order the supplement utilizing a web site that will provide the following functionality: 1) ability to customize the supplement dosing regimen, 2) user friendly access to academic and lay information about each supplement, 3) promotions offered by manufacturers, 4) a summary of totals of various ingredients administered, and 5) ability to sign up for automatic fulfillment, delivered to either home or stable.

The customizable dosing regimen allows the customer to specify: 1) the exact supplement(s) that the horse is to receive, 2) the maintenance dose for each supplement, and 3) any increases or decreases in the dose to be administered over time.

The website will allow the customer to view a table (FIG. 23) with each supplement being received constituting a row. The data in the table is the number of scoops of each supplement the horse is to receive each week (71). The website contains up and down arrows next to each supplement dose (72), allowing the end user to manually increase or decrease the amount of that supplement received for that week.

Figure 23:
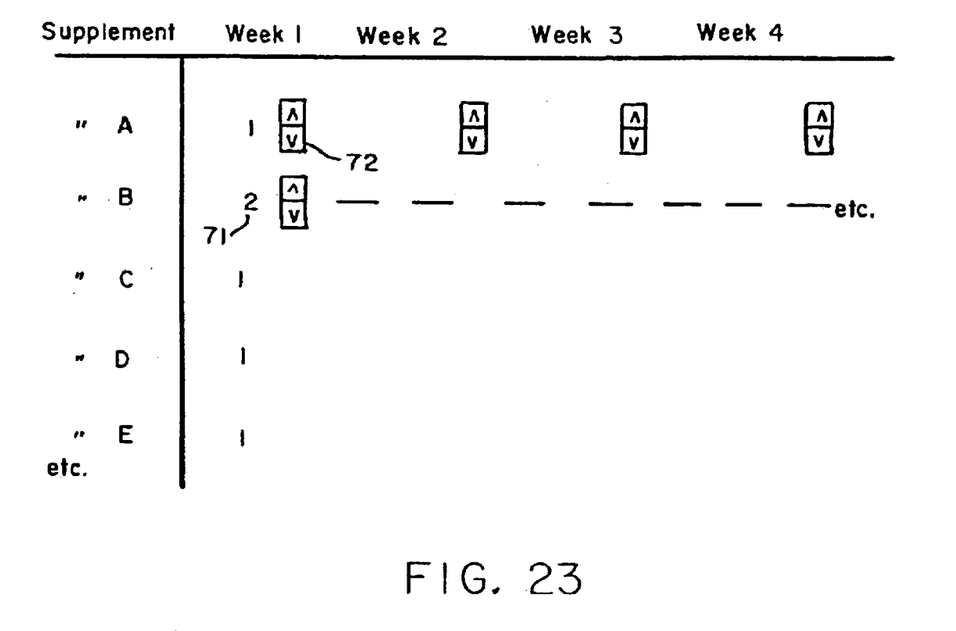
FIG. 23 is an exemplary representation useful in the ordering processes of the invention.

The ability to manually increase or decrease the supplement allows the customer to accomplish several objectives. First, the user can increase the dosage of a new supplement, to achieve a customized "loading dose." The manual adjustment feature also allows the customer to gradually add or subtract a supplement from a horse's diet, so as to minimize abrupt dietary changes, which are thought to contribute to colic. The website offers the potential to specify the dose based upon day of the week. This function is useful for horses that receive unusually high levels of work on the weekend.

The website also features several automatic functions. The most basic is the "Follow manufacturer's guidelines" button, that uses the horse's weight and/or customer described level of activity to calculate a maintenance dose. The website also allows the customer to "Feed Manufacturer's Recommended Loading Dose." An algorithm adjusts the basic maintenance dose of certain supplements up or down based upon environmental conditions, based upon the postal code to which the supplement package is mailed. For example, baseline electrolyte dosage is highest during the hottest months in the summer, to account for increased perspiration, whereas the dosage of hoof and skin supplements is increased slightly during the winter to account for the lower relative humidity.

To implement the automatic features, the website collects limited, but specific information pertaining to the horse to be supplemented. This information includes, but is not limited to: horse's weight, horse's gender (mare, gelding, stallion), horse's breed, type of work (rodeo, dressage, etc.), level of work, amount and type of hay fed, amount and type of grain fed, any routine medications, presence of certain diseases related to nutritional status.

The customer also receives user-friendly access to lay and academic information pertaining to supplements. These articles are organized into three areas. First, the general information section consists of general layperson and academic articles on horse nutrition and supplements. Second, category information includes articles on specific classes of supplements, such as joint supplements, and articles about specific supplements in that class. Third, the order form and manufacturer's showcase offers manufacturers the opportunity to publish their product literature, with links to their sites.

The website makes use of links embedded within the order form. A small case "i" with a circle surrounding it indicates the availability of information related to a specific supplement or class of supplements being considered. This includes both articles pertaining in their entirety to the subject at hand as well as articles where a reference is made to the supplement or class of supplements of interest. The link delivers the user directly to the relevant section of each article, which will be highlighted in a different color.

The website also features a promotions section, which allows manufacturers to offer a horse owner a special deal to encourage trial of a specific supplement. This is not commonly done, due to the high cost of the supplement and the relatively large tub sizes. In cooperation with the patent holder, manufacturers could offer a trial month with higher likelihood of successful long-term adoption by only offering the special to those customers who meet certain criteria.

The site also provides a partial warning system regarding supplement incompatibility, over-supplementation, or contraindications based upon horse demographics. There are risks involved in feeding of supplements. In some cases, too much of a specific ingredient is administered as a result of that ingredient being present in more than one supplement being administered. In other cases, the ratios of certain minerals are disturbed by the combination of two non-compatible supplements. The website is able to total all of the ingredients of the various supplements being fed. This summary of the raw ingredients fed is printed with each order for review by the individual's veterinarian. Although the system does not have complete purview of the nutrients being received by the horse, which are mainly coming from hay and grain, the system does flag certain ratio imbalances and may catch some cases of over-supplementation.

In another aspect of this invention, the order is taken over the Internet, with an application sending manufacturing instructions directly to the manufacturing plant, with the customized product being shipped directly to the customer's home on an automatic replenishment program.

The foregoing description of the invention is merely illustrative thereof, and it is understood that variations and modification can be made without departing from the spirit or scope of the invention as set forth in the following claims.

What is claimed is:

1. A method for administering supplement feed materials to a horse, comprising:
   (a) providing a multiple-sectioned unitary package comprising a polymer material of construction, the package comprising a plurality of the package sections;
   (b) adding to one or more package sections one or more edible supplement feed materials that have been selected for a specified horse,
   one or more package sections containing the one or more feed materials in an amount of within about 5 weight percent or less of a specified amount,
   the one or more feed materials chosen from among vitamins, minerals, electrolytes, proteins, or herbs; and
   (c) administering the supplement feed materials from the package to the horse.

2. The method of claim 1 wherein the package with added feed materials is 2 pounds or less.

3. The method of claim 1 wherein the plurality of package sections contain distinct feed materials.

4. The method of claim 3 wherein at least one package section contains a supplement containing a vitamin, at least one package section contains a supplement containing a mineral, and at least one package section contains a protein supplement.

5. A method for administering supplement feed materials to a horse, comprising:
   (a) providing a multiple-sectioned unitary package comprising a polymer martial of construction, the package comprising a plurality of the package sections each containing one or more edible supplement feed materials, wherein at least two of the plurality of package sections are groups according to their chemical composition,
   the plurality of package sections containing the one or more feed materials in an amount of within about 5 weight percent or less of a specified amount,
   the one or more feed materials chosen from among vitamins, minerals, electrolytes, proteins, or herbs;
   (b) administering the supplement feed materials from the package to the horse.

6. The method of claim 1 wherein the package sections are filled with an amount of feed material that corresponds to a specified horse.

7. The method of claim 1 wherein the package sections are filled with distinct feed materials that have been previously selected for a specified horse.

8. The method of claim 1 wherein the package contains two sections.

9. The method of claim 1 wherein the package contains three sections.

10. The method of claim 1 wherein the package contains four sections.

11. The method of claim 1 wherein the package contains five sections.

12. The method of claim 1 wherein the package contains six sections.

13. The method of claim 1 wherein the package sections are sealed prior to opening he package to administer the feed materials.

14. The method of claim 13 wherein the package sections are sealed from moisture or external atmosphere.

15. The method of claim 1 wherein the package is constructed from a flexible material.

16. The method of claim 1 wherein the package is rigid.

17. The method of claim 1 wherein the package body is rigid and has a top member.

18. A method for administering supplement feed materials to a horse, comprising;
   (a) selecting an amount of edible feed materials for a specified horse and adding the feed material in the selected amount to one or more package sections of a multiple-sectioned unitary package that comprises a plurality of package sections, the package comprising a polymer material of construction,
   one or more package sections made from plastic and containing the one or more feed materials in an amount of within about 5 weight percent or less of a specified amount,
   the one or more feed materials chosen from among vitamins, minerals, electrolytes, proteins or herbs;
   (b) administering the supplement feed materials from the package to the horse.

19. A method for administering supplement feed materials to a horse, comprising:
   (a) providing a multiple-sectioned unitary package comprising a polymer material of construction, a plurality of the package sections each containing one or more edible feed materials, wherein at least two of the plurality of package sections are separable from each other by hand,
   one or more package sections containing the one or more feed materials in an amount of within about 5 weight percent or less of a specified amount,
   the one or more feed materials chosen from among vitamins, minerals, electrolytes, proteins or herbs; and
   (b) administering the supplement feed materials from the package to the horse.

20. The method of claim 19 wherein the package comprises four or more sections.

21. A method for administering supplement feed materials to a horse, comprising:
   (a) packaging a plurality of distinct edible supplement materials in a plurality of compartments comprising a polymer material of construction, wherein each compartment is adjoined to at least one other compartment yet such that each supplement feed material is separated from all other supplement feed materials,
   the plurality of compartments containing the supplement materials in an amount of within about 5 weight percent or less of a specified amount,
   the supplement materials chosen from among vitamins, minerals, electrolytes, proteins, or herbs; and
   (b) administering the distinct supplement feed materials to the horse without use of an administration tool.

22. The method of claim 21 wherein the feed materials are contained in a multiple-sectioned unitary package prior to administration to the horse.

23. The method of claim 21 wherein the compartments are sleeve elements.

24. A method for administering supplement feed materials to a horse, comprising:
   (a) selecting one or more specified edible feed material for a specified horse and adding the selected feed material to one or more package sections of a multiple-sectioned unitary package comprising a polymer material of construction, the package comprising a plurality of the package sections,
   one or more package sections containing the one or more feed materials in an amount of within about 5 weight percent or less of a specified amount,
   the one or more feed materials chosen from among vitamins, minerals, electrolytes, proteins or herbs;

(b) administering the supplement feed materials from the package to the horse.

25. The method of claim 24 wherein a plurality of distinct feed materials are added to a plurality of package sections.

26. The method of claim 24 wherein a plurality of package sections contain distinct feed materials.

27. The method of claim 18 wherein the package with added feed materials is 2 pounds or less.

28. The method of claim 24 wherein the package with added feed materials is 2 pounds or less.

29. The method of claim 24 wherein the package contains four or more sections.

30. The method of claim 18 wherein the package contains four or more sections.

31. The method of claim 18 wherein a plurality of distinct feed materials are added to a plurality of package sections.

32. The method of claim 18 wherein a plurality of package sections contain distinct feed materials.

* * * * *